3,773,749
N-AMIDOPHENYLPHTHALIMIDE-AZO - 2 - HYDROXYNAPHTHOIC ACID-(3)-ARYLIDE, ACETOACETIC ACID ARYLIDE, PYRAZOLONE-(5), OR 5-AMINO PYRAZOLE DYESTUFFS
Walter Horstmann, Cologne-Buchheim, Edgar Siegel, Leverkusen-Steinbuechel, and Klaus Gerlach, Cologne-Flittard, Germany, assignors to Bayer Aktiengesellschaft, Leverkusen, Germany
No Drawing. Filed Apr. 7, 1969, Ser. No. 814,166
Claims priority, application Germany, Apr. 16, 1968, P 17 69 165.5; Aug. 23, 1968, P 17 95 211.3
Int. Cl. C09b 29/20, 29/22, 29/38
U.S. Cl. 260—152                      4 Claims

ABSTRACT OF THE DISCLOSURE

Sulphonic acid group-free monazo dyestuffs of the formula

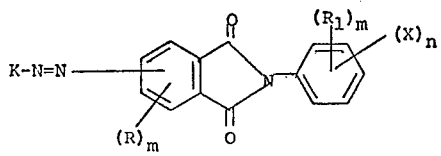

in which K is the radical of a monofunctional coupling component; R and $R_1$ are the same or different substituents; X is optionally substituted carboxamide or acylamino group; m is an integer from 0–3; and n is the number 1 or 2; are disclosed. These pigment dyestuffs are useful in coloring paper, lacquers and synthetic materials, e.g. in printing pastes and inks. These pigment dyestuffs are also distinguished by good fastness to light, solvents, migration and heat resistance.

---

The object of the present invention relates to valuable new monoazo dyestuffs which are free from sulphonic acid groups and correspond to the general formula

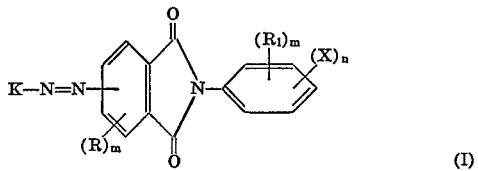

in which K represents the radical of a monofunctional coupling component, R and $R_1$ stand for the same or different substituents, X denotes an optionally substituted carboxamide or acylamino group, m stands for an integer from 0–3, and n stands for the numbers 1 or 2, as well as to a process for their production and their use as pigment dyestuffs.

Suitable radicals X are, for example:

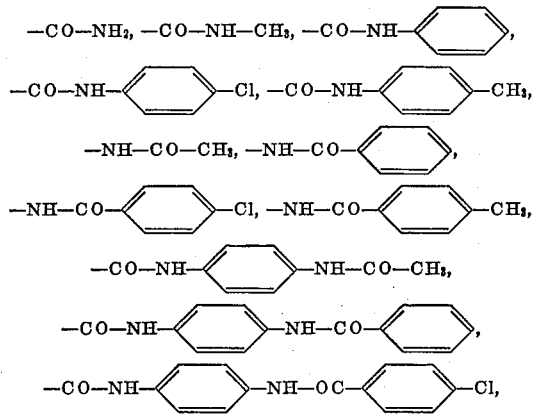

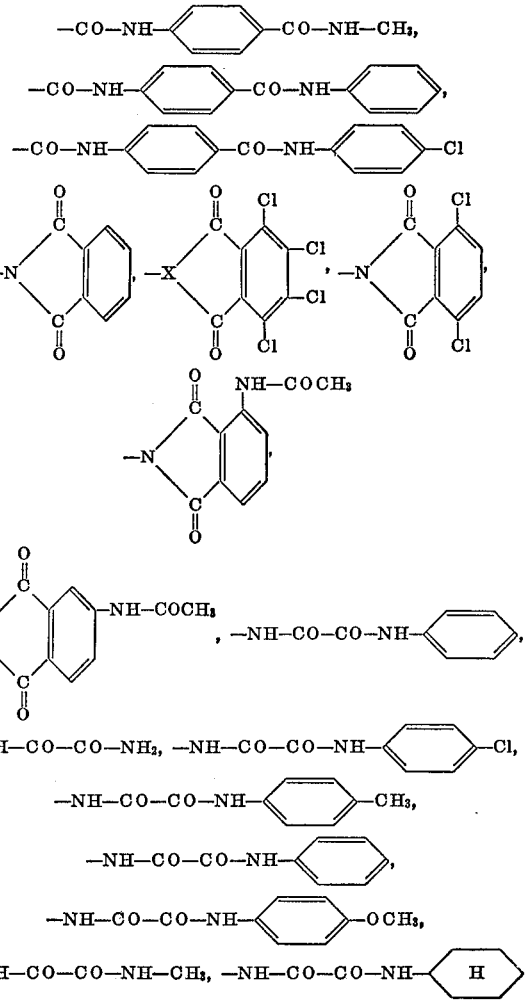

Substituents R or $R_1$ to be mentioned are, in particular, the following: optionally substituted alkyl groups especially those with 1–4 carbon atoms, such as methyl and ethyl groups; halogen atoms, such as fluorine, chlorine and bromine; alkoxy groups, such as methoxy and ethoxy groups, and trifluoromethyl groups.

Suitable radicals K are especially the radicals of 2-hydroxy - naphthoic acid - (3) - arylide, acetoacetic acid-arylide, pyrazolones-(5) and 5-aminopyrazoles.

Preferred dyestuffs are those of the general formula

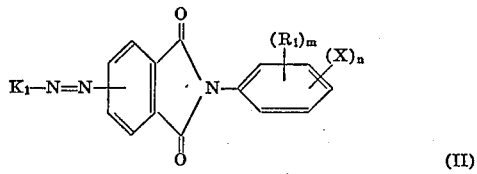

in which $K_1$ stands for the radical of a 2-hydroxynaphthoic acid-(3)-arylide, acetoacetic acid-arylide, pyrazolone-(5) or 5-aminopyrazole, and $R_1$, X, m and n have the same meaning as above,
but especially those of the formula

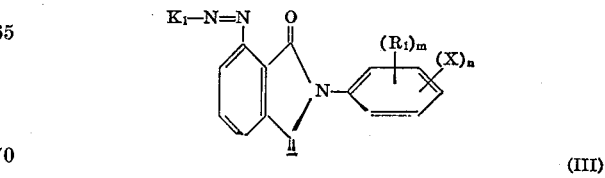

in which $R_1$, X, m and n have the same meaning as above, as well as those of the formula

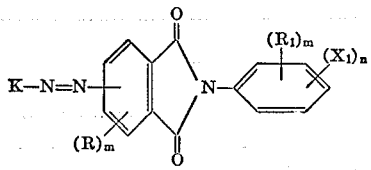

in which $X_1$ stands for a radical

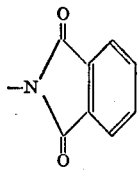

which may be further substituted in the phenyl ring, or for the radical —NHCO—CO—NH—$R_2$, wherein $R_2$ represents hydrogen or an optionally substituted phenyl group, particularly a phenyl group substituted by halogen, especially chlorine, and K, R, $R_1$, m and n have the same meaning as above.

Within the meaning of the dyestuffs of the general Formula IV those dyestuffs of the formula

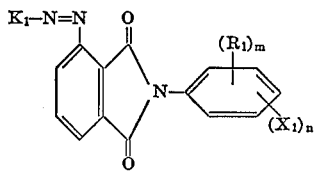

are preferred in which $K_1$, $R_1$, $X_1$, m and n have the same meaning as above.

The new azo dyestuffs of the Formula I are obtained by reacting azo compounds of the formula

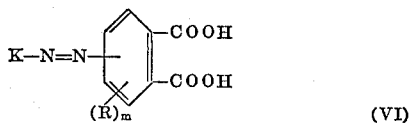

in which K, R and m have the same meaning as above, or their anhydrides, semi-esters or neutral esters with compounds of the formula

in which $R_1$, X, m and n have the same meaning as above, in a molar ratio of 1:1, optionally in the presence of suitable condensing agents, in a higher boiling organic solvent, and selecting the components in such a way that the final dyestuffs are free from sulphonic acid groups.

Within the scope of the products of the Formula I a group of especially valuable dyestuffs are obtained when compounds of the formula

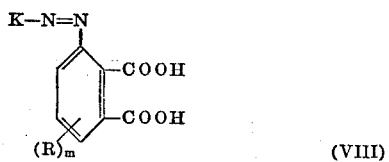

in which K, R and n have the same meaning as above, or the functional derivatives of these dicarboxylic acids, especially the mono- and di-esters or anhydrides, are reacted with compounds of the Formula VII, dyestuffs of the Formula III thus being formed.

Another process for the production of azo dyestuffs of the Formula I consists in diazotising in conventional manner amines of the formula

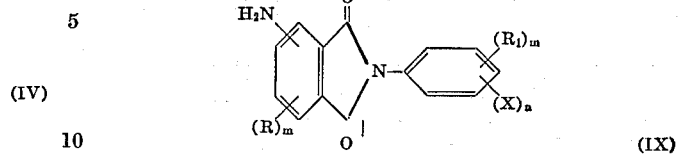

in which R, $R_1$, X, m and n have the same meaning as above, and coupling them with coupling components K—H.

The compounds of the Formula IX are obtained by reacting optionally substituted 3- and 4-nitrophthalic acids or their functional derivatives with compounds of the Formula VII in a higher boiling organic solvent, in the presence of acidic condensing agents, followed by the reduction of the nitro compounds obtained.

The starting dyestuffs of the Formulae VI and VIII are obtained in customary manner by diazotising the optionally substituted amino-phthalic acids or their functional derviatives and coupling with monofunctional coupling components. The following diazo components may be used for this purpose, for example:

3- and 4-amino-phthalic acid,
3- and 4-amino-phthalic acid-dimethyl ester,
3-amino-5-nitro-phthalic acid,
3-amino-6-methoxy-phthalic acid,
3-amino-4-methoxy-phthalic acid,
3-amino-6-chloro-phthalic acid,
3-amino-5,6-dimethoxy-phthalic acid,
4-amino-3-chloro-phthalic acid,
4-amino-5-chloro-phthalic acid,
4-amino-3-methyl-phthalic acid,
4-amino-5-methyl-phthalic acid,
4-amino-3-methoxy-phthalic acid,
4-amino-5-methoxy-phthalic acid and
4-amino-3,6-dichloro-phthalic acid.

Monofunctional coupling components K—H to be used are, for example:

2-hydroxy-naphthoic acid-(3)-anilide,
2-hydroxy-naphthoic acid-(3)-2'-methyl-anilide,
2-hydroxy-naphthoic acid-(3)-amide,
2-hydroxy-naphthoic acid-(3)-(4'-methyl)-anilide,
2-hydroxy-naphthoic acid-(3)-(2'-methyl)-anilide,
2-hydroxy-naphthoic acid-(3)-(4'-methoxy)-anilide,
2-hydroxy-naphthoic acid-(3)-(3'-nitro)-anilide,
2-hydroxy-naphthoic acid-(3)-(2'-chloro)-anilide,
2-hydroxy-naphthoic acid-(3)-(4'-chloro)-anilide,
2-hydroxy-naphthoic acid-(3)-(2',4'-dimethyl)-anilide,
2-hydroxy-naphthoic acid-(3)-(2'-methyl-5'-chloro)-anilide,
2-hydroxy-nahpthoic acid-(3)-(2'-methyl-4'-chloro)-anilide,
2-hydroxy-naphthoic acid-(3)-(2',5'-dimethoxy-4'-chloro)-anilide,
2-hydroxy-naphthoic acid-(3)-(2',4'-dimethoxy-5'-chloro)-anilide,
2-hydroxy-naphthoic acid-(3)-(2'-methyl-4'-methoxy)-anilide,
2-hydroxy-naphthoic acid-(3)-(2'-methoxy-5'-chloro)-anilide,
2-hydroxy-naphthoic acid-(3)-(2'-methyl-3'-chloro)-anilide,
2-hydroxy-naphthoic acid-(3)-[naphthyl-(1')]-amide,
2-hydroxy-naphthoic acid-(3)-[naphthyl-(2')]-amide,
2-hydroxy-naphthoic acid-(3)-(2'-ethoxy)-anilide,
2-hydroxy-nahpthoic acid-(3)-(4'-ethoxy)-anilide,
2-hydroxy-naphthoic acid-(3)-(2'-methoxy-5'-methyl)-anilide,
2-hydroxy-naphthoic acid-(3)-(4'-acetylamino)-anilide,
5-(2',3'-hydroxy-naphthoylamino)-benzimidazolone.

1-phenyl-3-methyl-pyrazolone-(5)-1-(3'-nitrophenyl)-
3-methyl-pyrazolone-(5),
1-(2'-chlorophenyl)-3-methyl-pyrazolone-(5),
1-phenyl-pyrazolone-(5)-carboxylic acid-(3)-amide,
1-phenylpyrazolone-(5)-carboxylic acid-(3)-methyl ester,
1-phenyl-3-methyl-5-aminopyrazole.

Acetoacetic acid anilide, acetoacetic acid-2-chloroanilide, acetoacetic acid - 2,4 - dimethyl-anilide, acetoacetic acid-2-methylanilide, acetoacetic acid - 2,5 - dimethoxy-4-chloroanilide, acetoacetic acid-2-methoxy-anilide, acetoacetic acid-[naphthyl - (1)] - amide, acetoacetic acid-2-methyl-3-chloroanilide, acetoacetic acid-2-methyl-5-chloro-anilide, acetoacetic acid-2-methyl-4-chloro-anilide, acetoacetic acid-2,4-dichloro-anilide, acetoacetic acid-2-nitro-4-chloro-anilide, acetoacetic acid-2-nitro-4-methyl-anilide, acetoacetic acid-2-nitro - 4 - methoxy-anilide, acetoacetic acid-4-ethoxy-anilide, acetoacetic acid-[6-ethoxy-benzothiazolyl-(2)]-amide, 5-acetoacetylamino - benzimidazolone.

The condensation of the azo Compounds (VI) or (VIII) according to the present process with the compounds of the type (VIII) is preferably effected in a higher boiling organic solvent and in the presence of dehydrating agents. The condensation is carried out, for example, at an elevated temperature, generally ranging from 80° C. to 240° C., but preferably between 100° C. and 180° C., optionally under pressure.

Compounds (VII) suitable for the production of the azo dyestuffs of the Formula I are, for example:

3-amino-benzamide,
2-chloro-5-amino-benzamide,
2-methoxy-5-amino-benzamide,
4-chloro-3-aminobenzamide,
4-aminobenzamide,
2-methoxy-4-amino-benzamide,
3-amino-acetanilide,
4-amino-acetanilide,
2,5-dichloro-4-aminoacetanilide,
3-benzamino-aniline,
4-benzamino-aniline,
3-(4'-chlorobenzamino)-aniline,
4-(4'-chlorobenzamino)-aniline,
3-(4'-methylbenzamino)-aniline,
4-(4'-methylbenzamino)-aniline,
4-methyl-carbamoyl-aniline,
3-methylcarbamoyl-aniline,
4-phenylcarbamoyl-aniline,
3-phenyl-carbamoyl-aniline,
4-(4'-chlorophenylcarbamoyl)-aniline,
3-(4'-chlorophenylcarbamoyl)-aniline,
4-(4'-methyl-phenyl-carbamoyl)-aniline,
3-(4'-methylphenylcarbamoyl) aniline,
4-amino-phthalic acid-diamide,
5-amino-iso-phthalic acid-diamide,
3,4-bis-(phenyl-carbamoyl)-aniline,
3,5-bis-(phenylcarbamoyl)-aniline,
3,5-bis-(methyl-carbamoyl)-aniline,
3,5-bis-(4'-chlorophenylcarbamoyl)-aniline,
3,5-bis-(4'-methylphenyl-carbamoyl)-aniline,
4-(4'-acetaminophenylcarbamoyl)-aniline,
4-(4'-benzamino-phenyl-carbamoyl)-aniline,
4-chloro-3-methylcarbamoyl-aniline,
4-chloro-3-phenyl-carbamoyl-aniline,
4-amino-2-acetamino-toluene,
4-chloro-2-amino-5-benzamino-toluene,
N-(4-amino-phenyl)-phthalimide,
N-(3-amino-4-methoxy-phenyl)-phthalimide,
N-(3-amino-6-methoxy-phenyl)-phthalimide,
N-(3-amino-4-chloro-phenyl)-phthalimide,
N-(3-amino-6-methyl-phenyl)-phthalimide,
N-(4-amino-2-methyl-phenyl)-phthalimide,
N-(4-amino-2,5-dichloro-phenyl)-phthalimide,
N-(3-aminophenyl)-phthalimide,
N-(4-aminophenyl)-3,6-dichloro-phthalimide,
N-(4-aminophenyl)-4-chloro-phthalimide,
N-(4-aminophenyl)-3-acetamino-phthalimide,
N-(4-aminophenyl)-4-acetamino-phthalimide,
N-(4-aminophenyl)- or N-(3-aminophenyl)-N'-phenyl-oxalic acid-diamide,
-N'-(4-chlorophenyl)-oxalic acid diamide,
-N'-(2,5-dichlorophenyl-oxalic acid diamide,
-N'-(4-methylphenyl)-oxalic acid diamide,
-N'-(4-methoxyphenyl)-oxalic acid diamide,
-N'-(2-methoxyphenyl)-oxalic acid diamide,
-N'-(2-chlorophenyl)-oxalic acid diamide,
-oxalic acid diamide,
-N'-methyl-oxalic acid diamide,
-N'-cyclohexyl-oxalic acid diamide,
N-(2-methoxy-4-amino-phenyl)-N'-phenyl-oxalic acid diamide,
N-(2-chloro-4-amino-phenyl)-N'-phenyl-oxalic acid diamide,
N-(2-methyl-4-amino-phenyl)-N'-phenyl-oxalic acid diamide,
N-(2-methoxy-5-amino-phenyl)-N'-phenyl-oxalic acid diamide.

Organic solvents suitable for the condensation of the monoazo dyestuffs (VI) or (VIII) or their derivatives with the compounds (VII) are, for example, the following boiling above 80° C.: benzene, toluene, xylenes, chlorobenzene, o-, m-, p-dichlorobenzene, trichlorobenzenes, quinoline, nitrobenzene, glacial acetic acid, cyclohexane, 1,2,3,4-tetrahydronaphthalene, naphthalene-, tetrachloroethylene, anisole, diphenyl ether, di-n-butyl ether, Decalin and mixtures of such solvents.

Condensing agents preferably to be used concurrently are the following, for example: acidic water-eliminating agents, such as formic acid, acetic acid, propionic acid, anhydrous sodium acetate, zinc chloride, iron(III) chloride, p-toluene-sulphonic acid.

The reaction of the compounds (VI) and (VIII) or their derivatives with the compounds (VII) is carried out in a molar ratio of about 1:1, the operation preferably being effected with an excess of 5 to 20% of the component (VII) in order to achieve a complete conversion.

Amino compounds (IX) suitable for the production of the azo dyestuffs (I) are, for example, N-(4'-carbamoyl-phenyl)-3-amino-phthalimide,
N-(4'-acetylamino-phenyl)-3-amino-phthalimide,
N-(4'-benzoylamino-phenyl)-3-amino-phthalimide,
N-(4'-phenylcarbamoyl-phenyl)-3-amino-phthalimide,
N-(4'-phthalimido-phenyl)-3-amino-phthalimide,
N-[4-(3'-amino-phthalimido)-phenyl]-N'-phenyl-oxalic acid diamide.

The products which can be obtained by the present process are valuable new pigment dyestuffs which are generally distinguished by good fastness to light, solvents and migration as well as by a good heat resistance in substrates of great variety. They are used for the colouring of paper, lacquers and synthetic materials, such as, for example, solubilizer-containing polyvinyl chloride, polyethylene and acrylonitrile/butadiene/styrene copolymers and graft polymers, and for the production of pigment pastes and printing inks.

The parts in the following examples are parts by weight and the temperatures are given as degrees centigrade.

EXAMPLE 1

10 parts of the azo dyestuff obtained from diazotised 3-amino-phthalic acid and 2-hydroxy-naphthoic acid-(3)-(4'-ethoxy)-anilide are heated at 120° for 1 hour in a mixture of 225 parts o-dichlorobenzene and 25 parts glacial acetic acid. 5.1 parts 4-benzamino-aniline are then added and the temperature is maintained at 120° for a further 10 hours, the product is filtered off with suction at 100°, washed with portions of 200 parts of hot o-dichlorobenzene and cold methanol, and dried at 80°. The yield amounts to 13.4 parts of a red pigment dyestuff which is fast to top coatings and light and corresponds to the formula

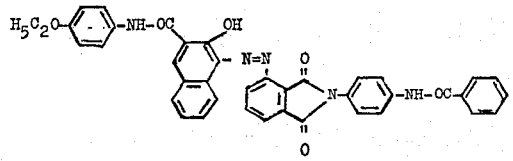

EXAMPLE 2

9.7 parts of the azo dyestuff obtained from diazotised 3-amino-phthalic acid and 2-hydroxy-naphthoic acid-(3)-(4'-methoxy)-anilide are heated at 110° for 1 hour in 200 parts chlorobenzene and 20 parts glacial acetic acid; 5.5 parts 4-(4'-chlorophenylcarbamoyl)-aniline are added, heating is continued for a further 6 hours at 120°, the pigment is filtered off with suction at 100°, washed with 200 parts hot chlorobenzene and 150 parts cold methanol, and dried at 80° in a vacuum. 13.8 parts of a red pigment dyestuff which is fast to migration and has the constitution

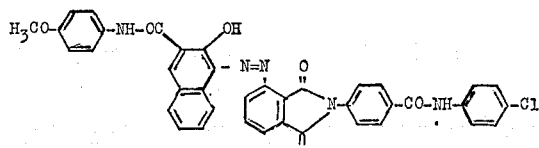

are obtained.

EXAMPLE 3

9.1 parts of the azo dyestuff obtained from diazotised 3-amino-phthalic acid and 2-hydroxy-naphthoic acid anilide and 5.5 parts 5-(4'-chlorobenzamino)-aniline are heated at 100° for 8 hours in a mixture of 200 parts nitrobenzene and 20 parts glacial acetic acid, the product is filtered off with suction at the same temperature, washed with portions of 100 parts nitrobenzene and methanol, and dried at 50°. The yield amounts to 13.2 parts of an orange pigment which is fast to top coatings and has the formula

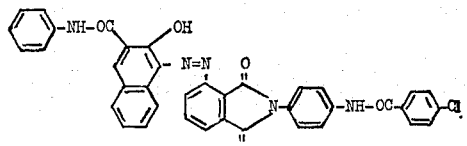

EXAMPLE 4

9.3 parts of the azo dyestuff obtained from diazotised 3-amino-phthalic acid and 2,5-dimethoxy-4-chloro-acetoacetic acid anilide are heated at 110° for 1 hour in a mixture of 225 parts o-dichlorobenzene and 25 parts glacial acetic acid; 8.5 parts 3,5-bis-(4'-chlorophenyl-carbamoyl)-aniline are then added and the temperature is maintained at 100–120° for a further 5 hours. The product is filtered off with suction at 100°, washed with 200 parts hot o-dichlorobenzene and 150 parts cold methanol and dried at 50° in a circulating cabinet. 16 parts of a yellow, hardly soluble pigment dyestuff of the formula

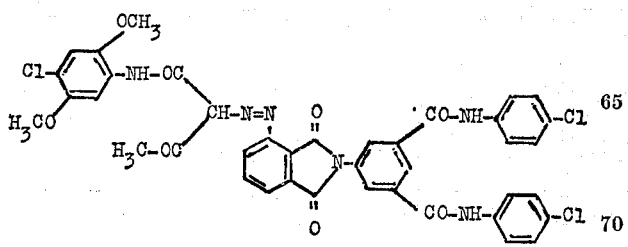

are obtained.

EXAMPLE 5

28 parts N-(4'-carbamoyl-phenyl)-3-amino-phthalimide are suspended in a mixture of 350 parts water and 40 parts concentrated hydrochloric acid and the suspension is diazotised with a solution of 7 parts sodium nitrite in 25 parts water at 5–10°. The excess of sodium nitrite is destroyed with amidosulphonic acid.

26.3 parts 2-hydroxy-naphthoic acid-(3)-anilide are suspended in a mixture of 250 parts of water and 50 parts of a 40% sodium hydroxide solution, the suspension converted into a solution at 50–60° and clarified after the addition of 3 g. active charcoal, the filtrate is mixed with 200 parts of ice and the above diazo suspension added in portions at about 10°.

When the coupling is completed, the product is filtered off with suction, washed with water until neutral and dried at 50°. The pulverised dyestuff is stirred at 80° in 250 parts pyridine, filtered off with suction, washed with 100 parts pyridine and 200 parts water and dried at 60° in a vacuum until the weight is constant. 50 parts of a red pigment dyestuff of the constitution

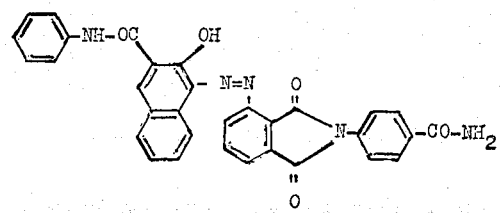

are obtained.

EXAMPLE 6

9.7 parts of the azo dyestuff obtained from diazotised 3-amino-phthalic acid and 2-hydroxy-naphthoic acid-(3)-(4'-methoxy)-anilide are heated at 120° for 1 hour in 200 parts o-dichlorobenzene and 20 parts glacial acetic acid. 5.2 parts N-(4-amino-phenyl)-phthalimide are then added and the temperature is maintained at 120° for a further 7 hours, the product is filtered off with suction at 100°, washed with portions of 200 parts hot o-dichlorobenzene and methanol and dried at 80°. A red pigment dyestuff which is extraordinarily fast to top finishes and light and corresponds to the formula

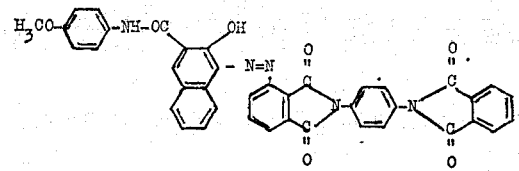

is obtained.

EXAMPLE 7

9.7 parts of the azo dyestuff obtained from diazotised 3-amino-phthalic acid and 2-hydroxy-naphthoic acid-(3)-(4'-methoxy)-anilide are heated at 120° for 1 hour in 200 parts o-dichlorobenzene and 20 parts glacial acetic acid. 5.5 parts 4-amino-oxalic acid anilide are then added and the temperature is maintained at 120° for a further 7 hours. The product is filtered off with suction at 100°, washed with portions of 200 parts of hot o-dichlorobenzene and methanol and dried at 80°. A red pigment dyestuff which is fast to top finishes and light and corresponds to the formula

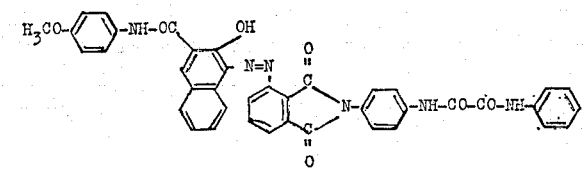

is obtained.

When the operation is carried out as described in the above examples but, instead of the diazo, coupling and imidation components there mentioned, the compounds set out in the following table are used, then valuable pigment dyestuffs are likewise obtained which exhibit the specified shades:

| Diazo component | Coupling component | Imidation component | Shade |
|---|---|---|---|
| 3-amino-phthalic acid | 2-hydroxy-naphthoic acid-anilide | 4-acetamino-aniline | Red. |
| Do | do | 4-benzamino-aniline | Red. |
| Do | do | 4-methylcarbamoyl-aniline | Red. |
| Do | do | 4-phenylcarbamoyl-aniline | Red. |
| Do | do | 4-(4'-chlorophenylcarbamoyl)-aniline | Red. |
| Do | do | 3,5-bis-(phenylcarbamoyl)-aniline | Red. |
| Do | do | 3,5-bis-(4'-chlorophenylcarbamoyl)-aniline | Red. |
| Do | do | 4-amino-benzoic acid-amide | Red. |
| Do | do | 3-amino-benzoic acid-amide | Red. |
| Do | 2-hydroxy-naphthoic acid-(3)-(2'-methyl)-anilide | 4-(4'-chlorophenylcarbamoyl)-aniline | Red. |
| Do | do | 4-(4'-chlorobenzamino)-aniline | Red. |
| Do | do | 3,5-bis-(phenylcarbamoyl)-aniline | Red. |
| Do | do | 3,5-bis-(4'-chlorophenylcarbamoyl)-aniline | Red. |
| Do | 2-hydroxy-naphthoic acid-(3)-(4'-chloro)-anilide | 4-(4'-chlorobenzamino)-aniline | Red. |
| Do | do | 4-benzamino-aniline | Red. |
| Do | do | 4-(4'-methyl-benzamino)-aniline | Red. |
| Do | do | 4-acetamino-aniline | Red. |
| Do | do | 4-(4'-chlorophenylcarbamoyl)-aniline | Red. |
| Do | do | 3,5-bis-(phenylcarbamoyl)-aniline | Red. |
| Do | do | 3,5-bis-(4'-cholorophenylcarbamoyl-)-aniline | Red. |
| Do | 2-hydroxy-naphthoic acid-(3)-(3'-nitro)-anilide | 4-acetamino-aniline | Red. |
| Do | do | 4-benzamino-aniline | Red. |
| Do | 2-hydroxy-naphthoic acid-(3)-(4'-ethoxy)-anilide | 4-acetamino-aniline | Red. |
| Do | do | 3-amino-benzoic acid-amide | Red. |
| Do | do | 4-amino-benzoic acid-amide | Red. |
| Do | do | 4-(4'-chloro-benzamino)-aniline | Red. |
| Do | do | 4-phenylcarbamoyl-aniline | Red. |
| Do | do | 4-(4'-chlorophenylcarbomoyl)-aniline | Red. |
| Do | do | 4-methylcarbamoyl-aniline | Red. |
| Do | do | 3,5-bis-(phenylcarbamoyl)-aniline | Red. |
| Do | do | 3,5-bis-(4'-chlorophenylcarbamoyl)-aniline | Red. |
| Do | do | 4-(4'-acetamino-phenylcarbamoyl)-aniline | Red. |
| Do | 2-hydroxy-naphthoic acid-(3)-(4'-methoxy)-anilide | 4-amino-benzoic acid-amide | Bordeaux. |
| Do | do | 4-acetamino-aniline | Do. |
| Do | do | 4-benzamino-aniline | Red. |
| Do | 2-hydroxy-naphthoic acid-(3)-(4'-methoxy)-anilide | 4-(4'-chlorobenzamino)-aniline | Red. |
| Do | do | 4-phenylcarbamoyl-aniline | Red. |
| Do | do | 4-methylcarbamoyl-aniline | Red. |
| Do | do | 3,5-bis-(phenylcarbamoyl)-aniline | Red. |
| Do | do | 3,5-bis-(4'-chlorophenylcarbamoyl)-aniline | Red. |
| Do | 2-hydroxy-naphthoic acid-(3)-(2'-methyl-4'-methoxy)-anilide | 4-acetamino-aniline | Bordeaux. |
| Do | do | 4-benzamino-aniline | Do. |
| Do | do | 4-methylcarbamoyl-aniline | Do. |
| Do | do | 4-phenylcarbamoyl-aniline | Do. |
| Do | do | 3,5-bis-phenylcarbamoyl)-aniline | Do. |
| Do | do | 3,5-bis-(4'-chloro-phenylcarbamoyl)-aniline | Do. |
| Do | 2-hydroxy-naphthoic acid-(3)-[naphthyl-(1)]-amide | 4-acetamino-aniline | Red. |
| Do | do | 4-benzamino-aniline | Red. |
| Do | do | 4-phenylcarbamoyl-aniline | Red. |
| Do | do | 4-(4'-chlorobenzamino)-aniline | Red. |
| Do | do | 4-(4'-chloro-phenylcarbamoyl)-aniline | Red. |
| Do | 2-hydroxy-naphthoic acid-(3)-[naphthyl-(2')]-amide | 4-acetamino-aniline | Red. |
| Do | do | 4-benzamino-aniline | Red. |
| Do | do | 4-phenylcarbamoyl-aniline | Red. |
| Do | do | 4-(4'-chlorobenzamino)-aniline | Red. |
| Do | do | 4-(4'-chloro-phenylcarbamoyl)-aniline | Red. |
| Do | do | 3,5-bis-(phenylcarbamoyl)-aniline | Red. |
| Do | 2-hydroxy-naphthoic acid-(3)-(2'-ethoxy)-anilide | 4-acetamino-aniline | Red. |
| Do | do | 4-benzamino-aniline | Red. |
| Do | do | 4-phenylcarbamoyl-aniline | Red. |
| Do | Acetoacetic acid-2,5-dimethoxy-4-chloro-anilide | 4-acetamino-aniline | Yellow. |
| Do | do | 4-benzamino-aniline | Do. |
| Do | do | 4-phenylcarbamoyl-aniline | Do. |
| Do | do | 4-(4'-chlorobenzamino)-aniline | Do. |
| Do | do | 4-(4'-chloro-phenylcarbamoyl)-aniline | Do. |
| Do | do | 3,5-bis-(phenylcarbamoyl)-aniline | Do. |
| 4-amino-phthalic acid | 2-hydroxy-napthoic acid-(3)-anilide | 4-acetamino-aniline | Red. |
| Do | do | 4-benzamino-aniline | Red. |
| Do | do | 4-phenylcarbamoyl-aniline | Red. |
| Do | do | 4-(4'-chlorobenzamino)-aniline | Red. |
| Do | do | 4-(4'-chlorophenylcarbamoyl)-aniline | Red. |
| 4-amino-5-methoxy-phthalic acid. | 2-hydroxy-naphthoic acid-(3)-(4'-ethoxy)-anilide | 4-acetamino-aniline | Red. |
| Do | do | 4-benzamino-aniline | Red. |
| Do | do | 4-(4'-chlorobenzamino)-aniline | Red. |
| Do | do | 4-phenylcarbamoyl-aniline | Red. |
| 3-amino-phthalic acid | 2-hydroxy-naphthoic acid-(3)-anilide | N-(4-amino-phenyl)-phthalimide | Red. |
| Do | do | 4-amino-oxalic acid-anilide | Red. |
| Do | do | 4-amino-4'-chloro-oxalic acid-anilide | Red. |
| Do | do | (4-amino-phenyl)-oxamide | Red. |
| Do | do | 4-amino-2',5'-dichloro-oxalic acid-anilide | Red. |
| Do | 2-hydroxy-naphthoic acid-(3)-(4'-chloro)-anilide | N-(4-amino-phenyl)-phthalimide | Red. |
| Do | do | 4-amino-oxalic acid-anilide | Red. |
| Do | do | 4-amino-4'-chloro-oxalic acid-anilide | Red. |
| Do | do | (4-amino-phenyl)-oxamide | Red. |
| Do | do | 4-amino-2',5'-dichloro-oxalic acid-anilide | Red. |
| Do | 2-hydroxy-naphthoic acid-(3)-(4'-ethoxy)-anilide | N-(4-amino-phenyl)-phthalimide | Red-brown. |
| Do | do | 4-amino-oxalic acid-anilide | Red. |
| Do | 2-hydroxy-naphthoic acid-(3)-(2'-methyl)-anilide | N-(4-amino-phenyl)-phthalimide | Red. |
| Do | 2-hydroxy-naphthoic acid-(3)-(2'-methoxy)-anilide | do | Red. |
| Do | Acetoacetic acid-2,5-dimethoxy-4-chloro-anilide | N-(4-amino-phenyl)-phthalimide | Yellow. |
| Do | do | 4-amino-oxalic acid-anilide | Do. |
| Do | 2-hydroxy-naphthoic acid-(3)-anilide | 2-methoxy-5-amino-benzamide | Red. |
| Do | do | 4-chloro-3-methylcarbamoyl-aniline | Red. |
| Do | do | N-(2-methoxy-4-amino-phenyl)-N'-phenyloxalic acid-diamide. | Red. |
| Do | do | N-(3-amino-6-methoxy-phenyl)-phthalimide | Red. |
| Do | do | N-(2-chloro-4-amino-phenyl)-N'-phenyloxalic acid diamide. | Red. |
| Do | do | N-(3-amino-phenyl)-phthalimide | Red. |
| Do | do | N-(3-amino-phenyl)-N'-phenyl-oxalic acid diamide | Red. |
| Do | do | 4-chloro-3-phenylcarbamoyl-aniline | Red. |
| Do | do | 4-amino-2-acetamino-toluene | Red. |

Further valuable pigment dyestuffs are obtained by replacing the 2-hydroxy-naphthoic acid-(3)-anilide in the above table by 2-hydroxy-naphthoic acid-(3)-(4'-chloro)-anilide,
2-hydroxy-naphthoic acid-(3)-(4'-ethoxy)-anilide,
2-hydroxy-naphthoic acid-(3)-(4'-methoxy)-anilide
2-hydroxy-naphthoic acid-(3)-(2'-methyl)-anilide,
2-hydroxy-naphthoic acid-(3)-(2'-methoxy)-anilide.

What is claimed is:
1. Sulfonic acid group-free monoazo dyestuff having the formula

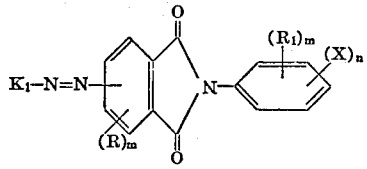

in which
$K_1$ is the radical of a coupling component said radical selected from the group consisting of a 2-hydroxy-naphthoic acid-(3)-arylide, acetoacetic acid-arylide, pyrazolone-(5) and 5-aminopyrazole;
R and $R_1$ are selected from the group consisting of hydrogen, alkyl having 1–4 carbon atoms, halogen, methoxy, ethoxy and trifluoromethyl;
X is selected from the group consisting of carbamoyl; N-methyl carbamoyl; N-phenyl-carbamoyl; N-phenyl-carbamoyl wherein said phenyl radical is substituted by methyl, acetylamino, chloro, benzoyl, methyl amino carbonyl, anilinocarbonyl or chloranilino carbonyl; acetylamino; N-benzoylamino; N-benzoylamino wherein said benzoyl radical is substituted by chlorine or methyl; phthalimido; phthalimido substituted in the benzo ring by chlorine or acetylamino; amino-oxalyl-amino; N-methyl-aminooxalylamino; N-cyclohexyl-aminooxalylamino; N-phenylamino-oxalylamino; and N-phenyl-amino-oxalylamino wherein said phenyl radical is substituted by chlorine, methyl or methoxy;
m is an integer from 0–3; and
n is the number 1 or 2.

2. The sulfonic acid group-free dyestuff of claim 1 wherein R is hydrogen.

3. The sulfonic acid group-free monoazo dyestuff of claim 1 having the formula

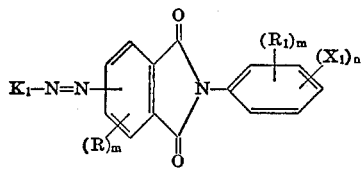

in which $X_1$ is selected from the group consisting of phthalimido; phthalimido substituted in the benzo ring by chlorine or acetylamino; amino-oxalylamino; N-methylaminooxalylamino; N-cyclohexylaminooxalylamino; N-phenyl-amino-oxalylamino; and N-phenylamino-oxalylamino wherein said phenyl radical is substituted by chlorine, methyl or methoxy; and
$K_1$, R, $R_1$, m and n have the same meaning as in claim 18.

4. Sulfonic acid group-free monoazo dyestuff of claim 1 having the formula

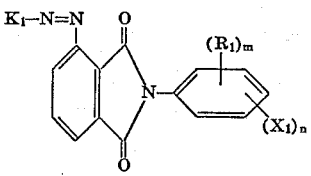

in which
$K_1$ is the radical of a coupling component said radical selected from the group consisting of a 2-hydroxy-naphthoic acid-(3)-arylide, acetoacetic acid arylide, pyrazolone-(5) and 5-aminopyrazole;
$X_1$ is selected from the group consisting of phthalimido; phthalimido substituted in the benzo ring by chlorine or methyl; amino-oxalyl-amino; N-methyl amino-oxalylamino; N-cyclohexyl-amino - oxalylamino; N-phenyl-amino-oxalylamino; and N-phenylamino-oxalylamino wherein said phenyl radical is substituted by chlorine, methyl or methoxy; and
$R_1$, m and n have the same meaning as in claim 1.

References Cited
UNITED STATES PATENTS

| | | | |
|---|---|---|---|
| 1,758,313 | 5/1930 | Eckert et al. | 260—152 |
| 2,159,542 | 5/1939 | Apotheker et al. | 260—152 X |
| 2,961,438 | 11/1960 | Fuchs et al. | 260—152 |
| 3,349,076 | 10/1967 | Weaver et al. | 260—152 |
| 3,379,712 | 4/1968 | Weaver et al. | 260—152 X |
| 3,386,987 | 6/1968 | Weaver et al. | 260—152 |
| 3,402,166 | 9/1968 | Heckl et al. | 260—152 |

FLOYD D. HIGEL, Primary Examiner

U.S. Cl. X.R.

106—23, 288 Q; 117—138.8 R, 138.8 B, 138.8 E, 138.8 UA, 154; 260—37 R, 41 R, 41 C, 157, 158, 162, 193, 203, 326 R, 326 N, 326 A